United States Patent [19]
Watanabe

[11] Patent Number: 5,798,869
[45] Date of Patent: Aug. 25, 1998

[54] IMMERSION-TYPE MICROSCOPE OBJECTIVE LENS

[75] Inventor: Katsuya Watanabe, Yokohama, Japan

[73] Assignee: Nikon Corporation, Tokyo, Japan

[21] Appl. No.: 736,145

[22] Filed: Oct. 28, 1996

[30] Foreign Application Priority Data

Nov. 14, 1995 [JP] Japan ................... 7-321160

[51] Int. Cl.$^6$ ............................................ G02B 21/02
[52] U.S. Cl. ................................. 359/658; 359/656
[58] Field of Search ............................. 359/656–661

[56] References Cited

U.S. PATENT DOCUMENTS

| | | | |
|---|---|---|---|
| 4,232,940 | 11/1980 | Nakagawa | 359/658 |
| 5,502,596 | 3/1996 | Suzuki | 359/659 |
| 5,532,878 | 7/1996 | Suenaga et al. | 359/656 |

FOREIGN PATENT DOCUMENTS

| | | | |
|---|---|---|---|
| 141077 | 4/1980 | Germany | 359/656 |

*Primary Examiner*—Georgia Y. Epps
*Assistant Examiner*—Jordan M. Schwartz
*Attorney, Agent, or Firm*—Klarquist Sparkman Campbell Leigh & Whinston, LLP

[57] ABSTRACT

An apochromatic, immersion-type microscope objective lens is disclosed, comprising (in order from the object side) a first lens group having positive refractive power, a second lens group having a positive refractive power, and a third lens group having a negative refractive power. The first lens group comprises a planoconvex lens element (having refractive index $n_1$) as the most objectwise lens element in the objective lens. The planoconvex lens element is "embedded" in and cemented to a negative meniscus lens having a refractive index $n_2$ and a convex surface oriented imagewise. Also in the first lens group is a positive meniscus lens element having a concave surface oriented objectwise. The second lens group comprises at least one compound lens. The third lens group comprises a cemented meniscus lens having a concave surface oriented imagewise. The objective lens satisfies Conditional Expressions including $n_2 - n_1 \geq 0.2$.

9 Claims, 7 Drawing Sheets

IMMERSION-TYPE MICROSCOPE OBJECTIVE LENS

FIELD OF THE INVENTION

This invention pertains to microscope objective lenses for use with an immersion oil.

BACKGROUND OF THE INVENTION

In the past, primarily two schemes have been used in immersion-type objective lenses for correcting image-plane distortion. According to a first scheme, a so-called Gauss configuration is used in which adjacent concave surfaces are oriented toward each other at an axial location characterized by low ray height. Such a scheme purportedly decreases the Petzval's sum that would otherwise be a problem as a result of the intensely negative refractive power of the lens elements having the concave surfaces. According to a second scheme, a planoconvex lens element having a relatively low-refractive index is used as the "lead" (i.e., most objectwise) lens element. The convex surface of the lead lens element is "embedded" in and cemented to an adjacent lens element having a higher refractive index. This provides a negative refractive power to the cemented laminated surface by means of the difference in the refractive indices of the constituent lens elements which, in turn, also decreases the Petzval's sum of the objective lens element. Immersion-type objective lenses made according to the second scheme have Petzval's sums nearly as low as "dry" (i.e., non-immersion type) objective lenses having a strong concave surface as the most objectwise lens surface.

An example of an approximately 40× apochromatic objective lens, intended for immersion use having an imbedded "lead" lens element, and in which the secondary spectrum has been reportedly eliminated, is disclosed in Japan Kôkai Patent Document No. HEI 6-160720. The objective lens disclosed in this reference represents a combination of the two schemes described above, and is purportedly designed to improve the flatness of the image plane. However, this objective lens exhibits an image height of up to, but not greater than, 10 mm according to the example embodiments described therein. Thus, this lens is apparently unable to produce excellent imaging properties across a wide field of view. In addition, because the lens has a Gauss-type configuration, it has numerous lens elements of which center-thickness tolerances must be very strict. Such combinations of a Gauss configuration with an embedded "lead" lens element are excessively costly.

SUMMARY OF THE INVENTION

An object of the present invention is to provide an apochromatic, immersion-type microscope objective lens having a magnification of approximately 40× and that is capable of effectively correcting image-plane distortion using only an embedded lens element and not also a Gauss-type configuration.

More specifically, an immersion-type microscope objective lens element according to the present invention comprises, in order from the object side, a first lens group having a positive refractive power, a second lens group having a positive refractive power, and a third lens group having a negative refractive power. The first lens group comprises, in order from the object side, a planoconvex lens element embedded in (i.e., cemented to) a negative meniscus lens element wherein the negative meniscus lens element has a convex surface oriented toward the image side; and a positive meniscus lens element having a concave surface oriented toward the object side. The second lens group comprises a compound lens. The third lens group comprises a cemented meniscus lens having a concave surface oriented toward the image side. The objective lens preferably satisfies each of the following Conditional Expressions:

$$n_2 - n_1 > 0.2 \quad (1)$$

$$4.5 \leq r_3/r_2 \leq 5.7 \quad (2)$$

$$5 \leq |f_{2n}/f| < 12 \quad (3)$$

$$1 \leq D_3/f \leq 3 \quad (4)$$

$$10 \leq r_e/[(n_{3p} - n_{3n})f] \leq 40$$

In the foregoing Conditional Expressions, $n_1$ is the refractive index of the planoconvex "embedded" lens element in the first lens group; $n_2$ is the refractive index of the negative meniscus lens element in the first lens group to which the embedded lens element is cemented; $r_2$ is the curvature radius of the cemented surface between the planoconvex embedded lens element and the negative meniscus lens element in the first lens group; $r_3$ is the curvature radius of the convex surface of the negative meniscus lens element in the first lens group; $f_{2n}$ is the focal length of a negative lens element in the compound lens in the second lens group, wherein the negative lens element is the most objectwise lens element in the second lens group; f is the overall focal length of the objective lens; $D_3$ is the overall axial thickness of the cemented meniscus lens of the third group; $n_{3p}$ is the refractive index of the positive lens element in the cemented meniscus lens of the third lens group; $n_{3n}$ is the refractive index of the negative lens element in the cemented meniscus lens in the third lens group; and $r_e$ is the curvature radius of the most imagewise surface of the objective lens.

DETAILED DESCRIPTION

As used herein, the "object side" of an objective lens is the axial region situated between the objective lens and an object viewed using the lens. The "image side" is the axial region situated between the objective lens and an image formed by the lens. "Imagewise" is an orientation toward or facing the image side; and "objectwise" refers to an orientation toward or facing the object side. In each of the optical diagrams herein, the object side is the left-hand side and the image side is the right-hand side of the diagram.

3

Figure 1:
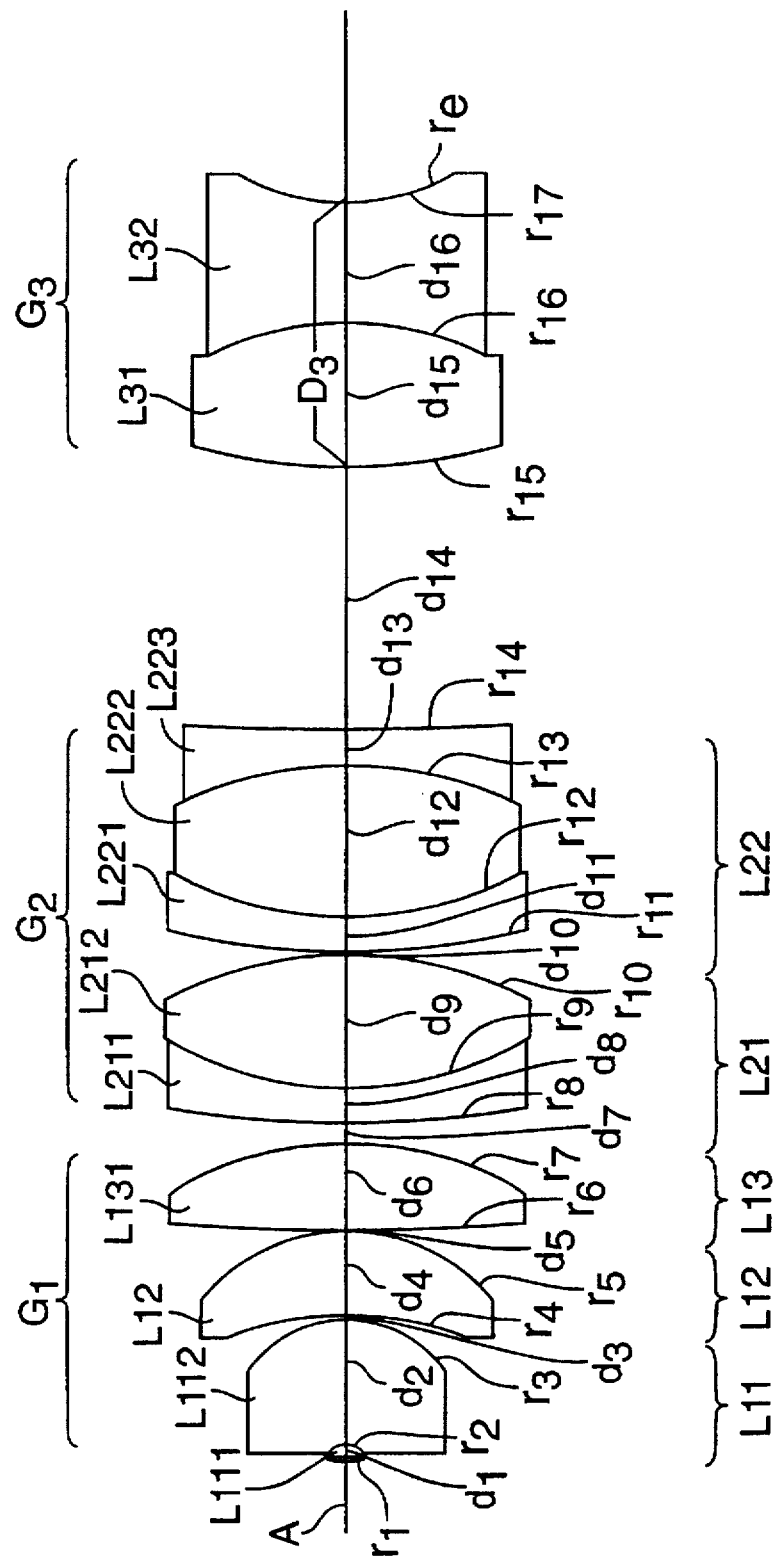
FIG. 1 is an optical diagram showing general features of objective lenses according to the present invention as well as specific features of Example Embodiment 1.

FIG. 1 depicts, inter alia, general features of a preferred embodiment of an objective lens according to the present invention. The objective lens comprises, in order from the object side, three lens groups situated on an optical axis A. The first lens group $G_1$ has a positive refractive power, the second lens group $G_2$ has a positive refractive power, and the third lens group $G_3$ has a negative refractive power.

The first lens group $G_1$ comprises, in order from the object side, a planoconvex lens element L111 embedded in (i.e., cemented to) a negative meniscus lens element L112. These two lens elements form the cemented lens L11. The negative meniscus lens element L112 has a convex surface $r_3$ oriented toward the image side. The first lens group $G_1$ also comprises a positive meniscus lens element L12 having a concave surface $r_4$ oriented toward the object side. Finally, the first lens group $G_1$ can also have a positive lens L13 that can be either a single lens element (as shown in FIG. 1) or a cemented lens.

In FIG. 1, the second lens group $G_2$ comprises, in order from the object side, a first positive lens L21 and a second positive lens L22, each of which is preferably a cemented lens of two or more lens elements as shown in FIG. 1. Thus, the second lens group $G_2$ comprises at least one compound lens.

The third lens group $G_3$ comprises a cemented meniscus lens having a concave surface $r_e$ oriented toward the image side. The cemented lens preferably includes a convex lens element L31 cemented to a concave lens element L32.

An objective lens according to the present invention preferably satisfies each of the following Conditional Expressions:

$$n_2 - n_1 \geq 0.2 \quad (1)$$

$$4.5 \leq r_3/r_2 \leq 5.7 \quad (2)$$

$$5 \leq |f_{2n}/f| < 12 \quad (3)$$

$$1 \leq D_3/f \leq 3 \quad (4)$$

$$10 \leq r_e/[(n_{3p} - n_{3n})f] \leq 40 \quad (5)$$

The variables in the foregoing Conditional Expressions are as follows:

$n_1$: refractive index of the planoconvex embedded lens element L111 in the first lens group $G_1$;

$n_2$: refractive index of the negative meniscus lens element L112 in the first lens group $G_1$;

$r_2$: curvature radius of the cemented surface between the planoconvex lens element L111 and the negative meniscus lens element L112 in the cemented lens L11 of the first lens group $G_1$;

$r_3$: curvature radius of the convex surface of the negative meniscus lens element L112 in the first lens group $G_1$;

$f_{2n}$: focal length of the negative lens element L211 (the most objectwise negative lens element in the second lens group $G_2$) in the compound lens L21 in the second lens group $G_2$;

f: overall focal length of the objective lens;

$D_3$: overall axial thickness of the cemented meniscus lens of the third lens group $G_3$;

$n_{3p}$: refractive index of the positive lens element L31 in the cemented meniscus lens of the third lens group $G_3$;

$n_{3n}$: refractive index of the negative lens element L32 in the cemented meniscus lens in the third lens group $G_3$; and

4

$r_e$: curvature radius of the most imagewise surface (concave) of the objective lens.

As shown in FIG. 1, the first lens group $G_1$ comprises the cemented lens L111 including the planoconvex embedded lens element L111. The embedded lens element L111 has a refractive index $n_1$ that is the same or nearly the same as the refractive index of the immersion liquid (e.g., immersion oil) with which the objective lens is used. This imparts virtually no spherical aberration at the interface $r_1$ between the immersion liquid and the lens L111. This, in turn, allows the tolerances for the thicknesses of the constituent lens elements in the objective lens to be relaxed.

In order to effectively achieve flatness of the image plane, the Petzval's sum of the objective lens must be made as small as possible. Most of this effect is borne by the cemented lens L11, and Conditional Expressions (1) and (2) establish criteria appropriate to achieve this end.

Conditional Expression (1) concerns the curvature radii of the surface of the planoconvex lens element L111 and the surface of the meniscus lens element L112 that are cemented to each other. (The curvature radius of the lens element L111 is determined by the curvature radius of the lens element L112.) If Conditional Expression (1) is not satisfied, a sufficient negative refractive power will not be obtained in the cemented surface $r_2$ to sufficiently decrease Petzval's sum of the objective lens.

Conditional Expression (2) establishes acceptable ranges for the curvature radii $r_2$ and $r_3$. If $r_3/r_2$ should fall below the lower limit of Conditional Expression (2), the Petzval's sum of the objective lens would be too great, thereby degrading image flatness. If the upper limit of Conditional Expression (2) were to be exceeded, the image flatness of the objective lens would possibly be acceptable, but the curvature radius of the cemented surface $r_2$ would be unacceptably small, thereby making fabrication of the objective lens extremely difficult. Excessively increasing the curvature radius $r_2$ to avoid such a problem could necessitate the curvature radius $r_3$ being too large, thereby greatly weakening the refractive power of the convex surface $r_3$. This would cause the light flux passing through the cemented lens L11 to excessively diverge, which would increase spherical aberration to levels that would be difficult to correct in the other lens groups $G_2$, $G_3$.

Light flux exiting the cemented lens L11 is refracted by the other positive lenses L12, L13 of the first lens group $G_1$ as the light flux propagates to the second lens group $G_2$. Preferably, the lens L12 is a positive meniscus lens element L12 having a concave surface $r_4$ oriented toward the object side, and the lens L13 is a biconvex lens L13 serving to make the deflection angle of marginal rays as small as possible.

The second lens group $G_2$, upon receiving the still divergent light flux from the first lens group $G_1$, renders the light flux convergent while correcting primarily spherical aberration and chromatic aberration. Conditional Expression (3) provides limits for suitably correcting this spherical and chromatic aberration. Exceeding the upper limit of Conditional Expression (3) would result in an insufficient correction of these aberrations. If correction of these aberrations were to be delegated to other negative lens elements, then longitudinal chromatic aberration would increase. If $|f_{2n}/f|$ were to fall below the lower limit of Conditional Expression (3), then spherical and chromatic aberrations would be over-corrected, resulting in an especially high degree of spherical aberration that would be impossible to correct.

The third lens group $G_3$ serves, inter alia, to correct primarily transverse and longitudinal chromatic aberration.

Any residual image-plane distortion is corrected by the final (most imagewise) concave surface $r_e$.

Conditional Expression (4) establishes the overall axial thickness of the cemented meniscus lens in the third lens group $G_3$. The thicker this cemented lens, the more effectively it works to minimize secondary spectra and Petzval's sum. However, exceeding the upper limit of Conditional Expression (4) would unacceptably increase the difficulty of manufacturing the objective lens, which in turn would unacceptably increase cost.

Conditional Expression (5) also pertains to the cemented meniscus lens comprising the third lens group $G_3$. Exceeding the upper limit of Conditional Expression (5) would cause an unacceptable deterioration of the flatness of the image plane. Falling below the lower limit of Conditional Expression (5) would cause an unacceptable worsening of chromatic coma and coma aberration in the sagittal direction.

Hence, by fulfilling all of the foregoing Conditional Expressions, immersion-type apochromatic objective lenses according to the present invention exhibiting excellent image flatness and superior correction of chromatic aberration are provided.

Example Embodiments

Figure 3:
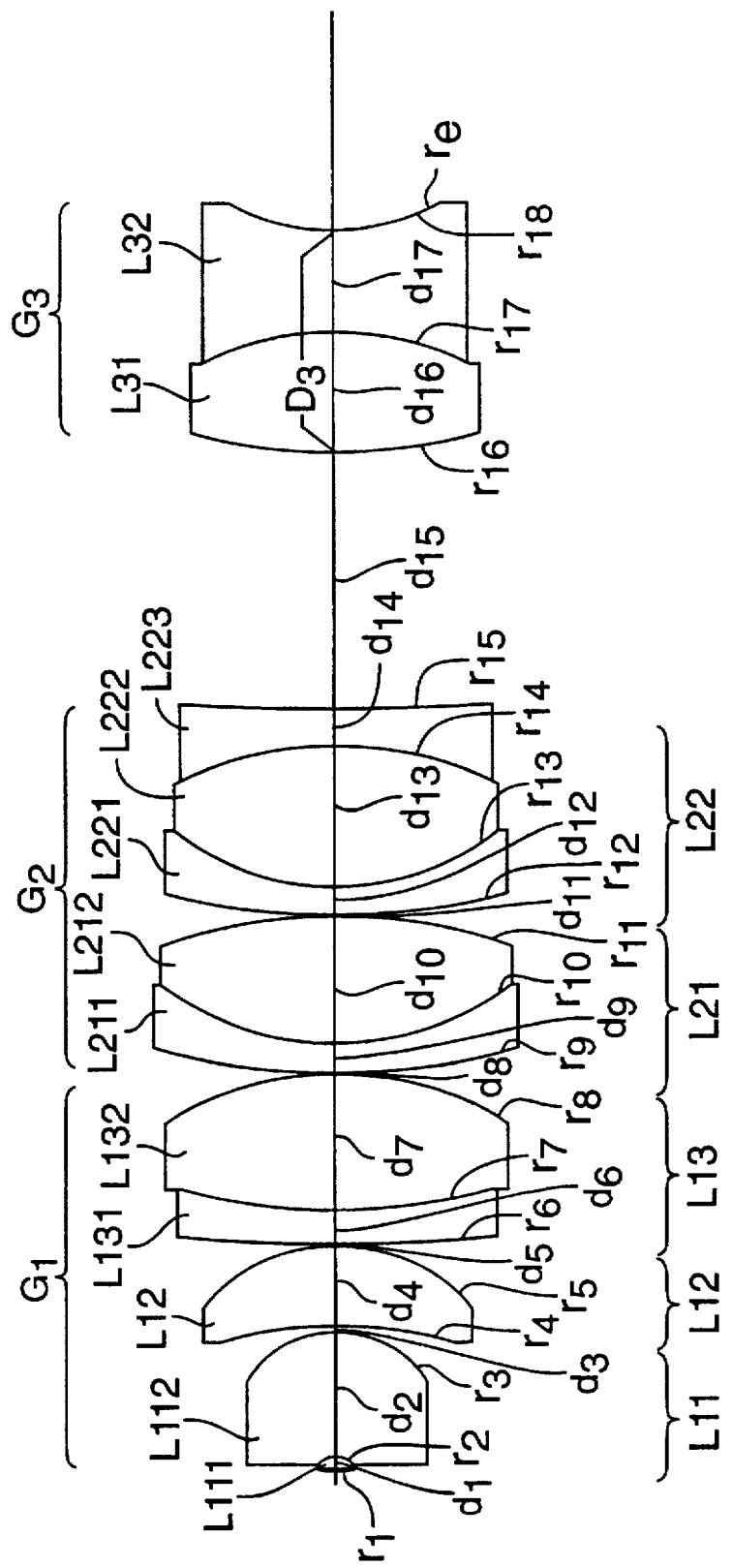
FIG. 3 is an optical diagram showing specific features of Example Embodiment 2.
Figure 5:
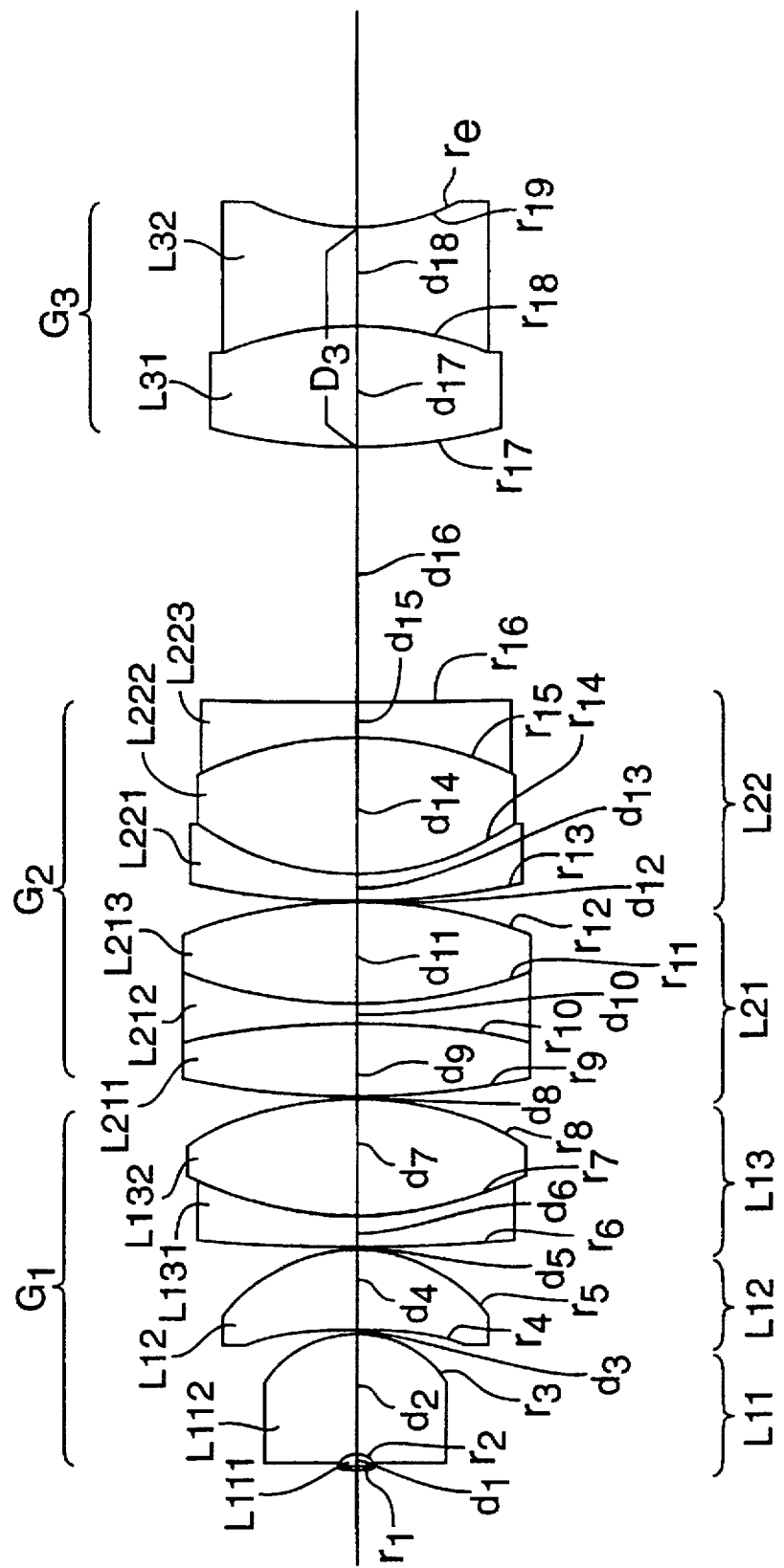
FIG. 5 is an optical diagram showing specific features of Example Embodiment 3.

FIGS. 1, 3, and 5 depict specific features of Example Embodiments 1, 2, and 3, respectively. Each Example Embodiment comprises, in order from the object side, a first lens group $G_1$ having a positive refractive power, a second lens group $G_2$ having a positive refractive power, and a third lens group $G_3$ having a negative refractive power.

The first lens group $G_1$ comprises a "lead" (most objectwise) cemented lens L11 including, from the object side, a planoconcave lens element L111 cemented to a negative meniscus lens element L112 having a convex surface oriented imagewise. The first lens group $G_1$ also comprises a positive meniscus lens L12 having a concave surface oriented objectwise. Finally, the first lens group $G_1$ in these Example Embodiments comprises a positive lens L13.

The second lens group $G_2$ in these Example Embodiments comprises first and second positive cemented lenses L21, L22. Thus, the second lens group $G_2$ comprises at least one compound lens.

The third lens group $G_3$ in these Example Embodiments comprises a cemented negative meniscus lens formed by cementing a convex lens element L31 to a concave lens element L32. The cemented lens has a concave surface $r_e$ oriented imagewise. The surface $r_e$ is the most imagewise surface of the objective lens.

In Example Embodiment 2, the glass materials used to make the lens elements are suitable for use of the objective lens in ultraviolet-excitation fluorescence microscopy. For such an application, a suitable glass material for lens elements intended to refract ultraviolet light is fused silica (quartz).

Example Embodiment 3 is also suitable for ultraviolet-excitation fluorescence microscopy. In Example Embodiment 3, the two-element cemented lens L21 in the second lens group $G_2$ of Example Embodiment 2 is replaced with a 3-element cemented lens which further improves the optical performance.

The various specifications for Example Embodiments 1, 2, and 3 are set forth in Tables 1, 2, and 3, respectively. In the "Overall Specifications" portion of each Table, f denotes the focal length of the objective lens, N.A. denotes the numerical aperture of the objective lens, $\beta$ denotes the magnification of the objective lens, and W.D. represents the working distance of the objective lens (i.e., the distance from the surface $r_1$ to the surface of an object being observed using the lens. In the "Lens Specifications" portion of each Table, the first column sets forth the surface numbers of the constituent lens elements, beginning with the most objectwise surface; the second column bearing the heading "r" sets forth the lens curvature radii for the lens surfaces; the third column bearing the heading "d" sets forth axial distances between adjacent lens surfaces; the fourth column bearing the heading "$n_D$" sets forth the refractive indices of the lens elements (with respect to D-line light; $\lambda$=587.6 nm); the fifth column bearing the heading "$v_D$" sets forth the Abbe numbers of the lens elements with respect to D-line light; and the sixth column shows corresponding lens-group numbers.

Table 4, below, sets forth the values of the Conditional Expressions exhibited by each Example Embodiment.

Additionally, each of the Example Embodiments is designed for oil-immersion use with oil having $n_D$=1.51536, and $v_D$=41.36, with a 0.17-mm cover glass placed between the object and the most objectwise lens surface $r_1$.

TABLE 1

Overall Specifications
f = 5 mm N.A. = 1.0
$\beta$ = −40.0 W.D. = 0.1713 mm
Lens Specifications

| No. | r (mm) | d (mm) | $n_D$ | $v_D$ | Lens Group |
|---|---|---|---|---|---|
| 1 | ∞ | 0.65 | 1.51680 | 64.10 | $G_1$ |
| 2 | −1.031 | 6.0 | 1.76684 | 46.80 | $G_1$ |
| 3 | −5.724 | 0.25 | | | |
| 4 | −16.881 | 4.0 | 1.49782 | 82.52 | $G_1$ |
| 5 | −8.965 | 0.1 | | | |
| 6 | 127.147 | 4.0 | 1.49782 | 82.52 | $G_1$ |
| 7 | −17.097 | 1.0 | | | |
| 8 | 55.240 | 1.5 | 1.75520 | 27.61 | $G_2$ |
| 9 | 16.097 | 6.3 | 1.43385 | 95.25 | $G_2$ |
| 10 | −20.151 | 0.2 | | | |
| 11 | 32.616 | 1.7 | 1.74000 | 28.19 | $G_2$ |
| 12 | 18.275 | 7.0 | 1.43385 | 95.25 | $G_2$ |
| 13 | −18.275 | 1.7 | 1.52682 | 51.35 | $G_2$ |
| 14 | 188.206 | 12.5 | | | |
| 15 | 25.968 | 6.9 | 1.61750 | 30.83 | $G_3$ |
| 16 | −15.077 | 5.6 | 1.52682 | 51.35 | $G_3$ |
| 17 | 11.230($R_e$) | | | | |

TABLE 2

Overall Specifications
f = 5 mm N.A. = 1.0
$\beta$ = −40.0 W.D. = 0.1713 mm
Lens Specifications

| No. | r (mm) | d (mm) | $n_D$ | $v_D$ | Lens Group |
|---|---|---|---|---|---|
| 1 | ∞ | 0.65 | 1.51823 | 58.90 | $G_1$ |
| 2 | −1.031 | 6.0 | 1.77073 | 50.22 | $G_1$ |
| 3 | −5.477 | 0.25 | | | |
| 4 | −24.966 | 4.0 | 1.43385 | 95.25 | $G_1$ |
| 5 | −8.533 | 0.15 | | | |
| 6 | 105.261 | 1.5 | 1.62004 | 36.27 | $G_1$ |
| 7 | 27.021 | 6.5 | 1.43385 | 95.25 | $G_1$ |
| 8 | −17.763 | 0.1 | | | |
| 9 | 29.557 | 1.55 | 1.57501 | 41.42 | $G_2$ |
| 10 | 14.419 | 6.3 | 1.43385 | 95.25 | $G_2$ |
| 11 | −28.320 | 0.15 | | | |
| 12 | 42.870 | 1.35 | 1.60342 | 38.03 | $G_2$ |

TABLE 2-continued

Overall Specifications
f = 5 mm N.A. = 1.0
β = –40.0 W.D. = 0.1713 mm
Lens Specifications

| No. | r (mm) | d (mm) | $n_D$ | $v_D$ | Lens Group |
|---|---|---|---|---|---|
| 13 | 13.468 | 6.75 | 1.43385 | 95.25 | $G_2$ |
| 14 | –17.270 | 1.85 | 1.60342 | 38.03 | $G_2$ |
| 15 | 317.805 | 12.4 | | | |
| 16 | 27.454 | 6.0 | 1.68893 | 31.08 | $G_3$ |
| 17 | –16.587 | 5.0 | 1.56384 | 60.69 | $G_3$ |
| 18 | 11.319($R_e$) | | | | |

TABLE 3

Overall Specifications
f = 5 mm N.A. = 1.0
β = –40.0 W.D. = 0.1713 mm
Lens Specifications

| No. | r (mm) | d (mm) | $n_D$ | $v_D$ | Lens Group |
|---|---|---|---|---|---|
| 1 | ∞ | 0.65 | 1.51823 | 58.90 | $G_1$ |
| 2 | –1.031 | 6.0 | 1.77073 | 50.22 | $G_1$ |
| 3 | –5.584 | 0.2 | | | |
| 4 | –24.557 | 4.0 | 1.49782 | 82.52 | $G_1$ |
| 5 | –8.641 | 0.15 | | | |
| 6 | 108.446 | 1.5 | 1.60342 | 38.03 | $G_1$ |
| 7 | 19.412 | 5.7 | 1.43385 | 95.25 | $G_1$ |
| 8 | –16.874 | 0.1 | | | |
| 9 | 38.463 | 3.8 | 1.49782 | 82.52 | $G_2$ |
| 10 | –44.231 | 1.0 | 1.55200 | 49.71 | $G_2$ |
| 11 | 25.052 | 5.0 | 1.43385 | 95.25 | $G_2$ |
| 12 | –28.734 | 0.1 | | | |
| 13 | 40.212 | 1.3 | 1.60342 | 38.03 | $G_2$ |
| 14 | 13.649 | 6.7 | 1.43385 | 95.25 | $G_2$ |
| 15 | –17.653 | 1.8 | 1.60342 | 38.03 | $G_2$ |
| 16 | 563.685 | 12.4 | | | |
| 17 | 26.604 | 6.0 | 1.68893 | 31.08 | $G_3$ |
| 18 | –17.707 | 5.0 | 1.56384 | 60.69 | $G_3$ |
| 19 | 11.386($R_e$) | | | | |

TABLE 4

| Conditional Expression | Example Embodiments | | |
|---|---|---|---|
| | 1 | 2 | 3 |
| (1) $n_2 - n_1$ | 0.250 | 0.252 | 0.252 |
| (2) $r_3/r_2$ | 5.55 | 5.31 | 5.42 |
| (3) $|f_{2n}/f|$ | 6.12 | 10.17 | 5.77 |
| (4) $D_3/f$ | 2.5 | 2.2 | 2.2 |
| (5) $r_e/[(n_{3p} - n_{3n})f]$ | 24.77 | 18.10 | 18.21 |

Figure 2:
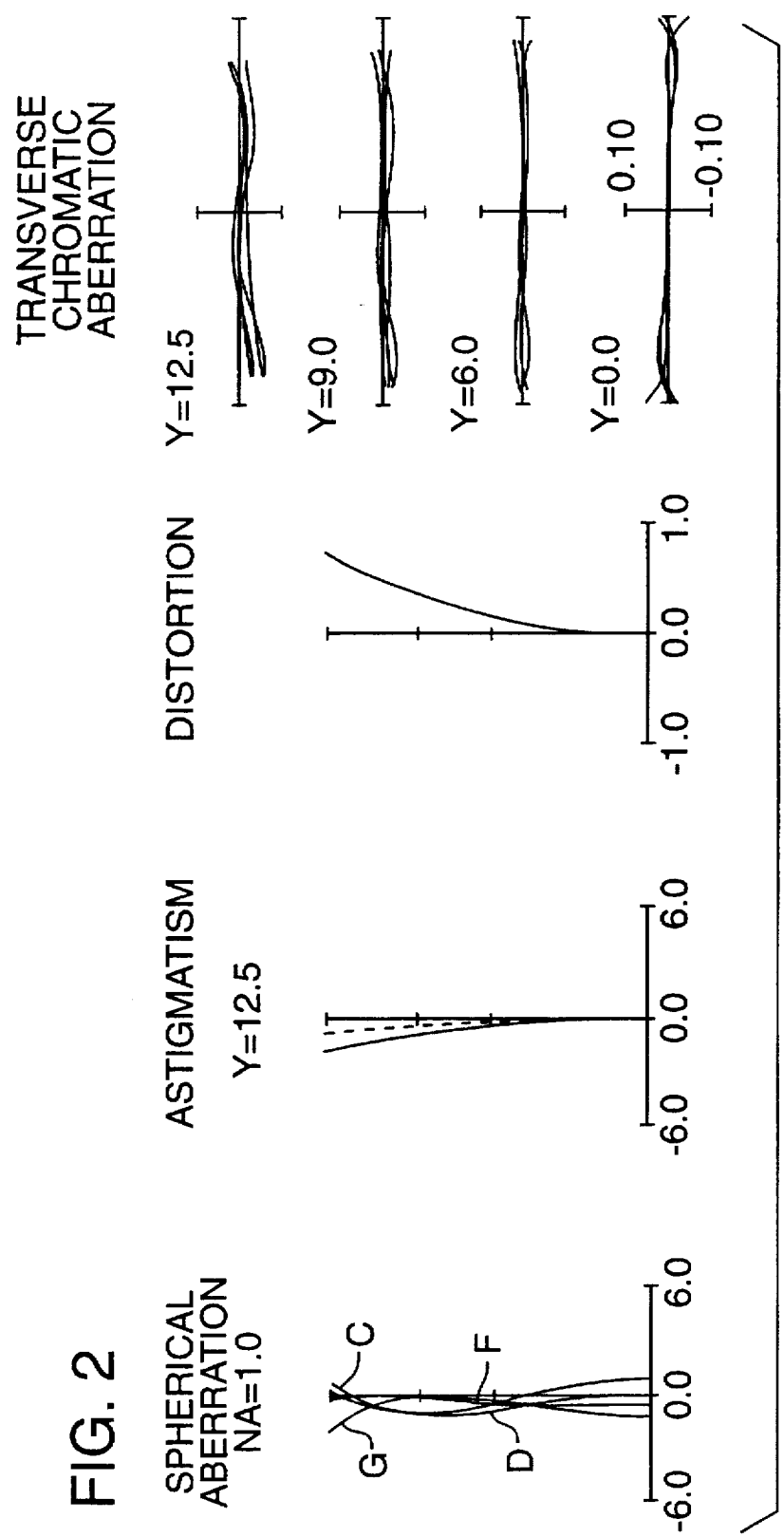
FIG. 2 provides plots of various aberrations exhibited by an objective lens according to Example Embodiment 1.
Figure 4:
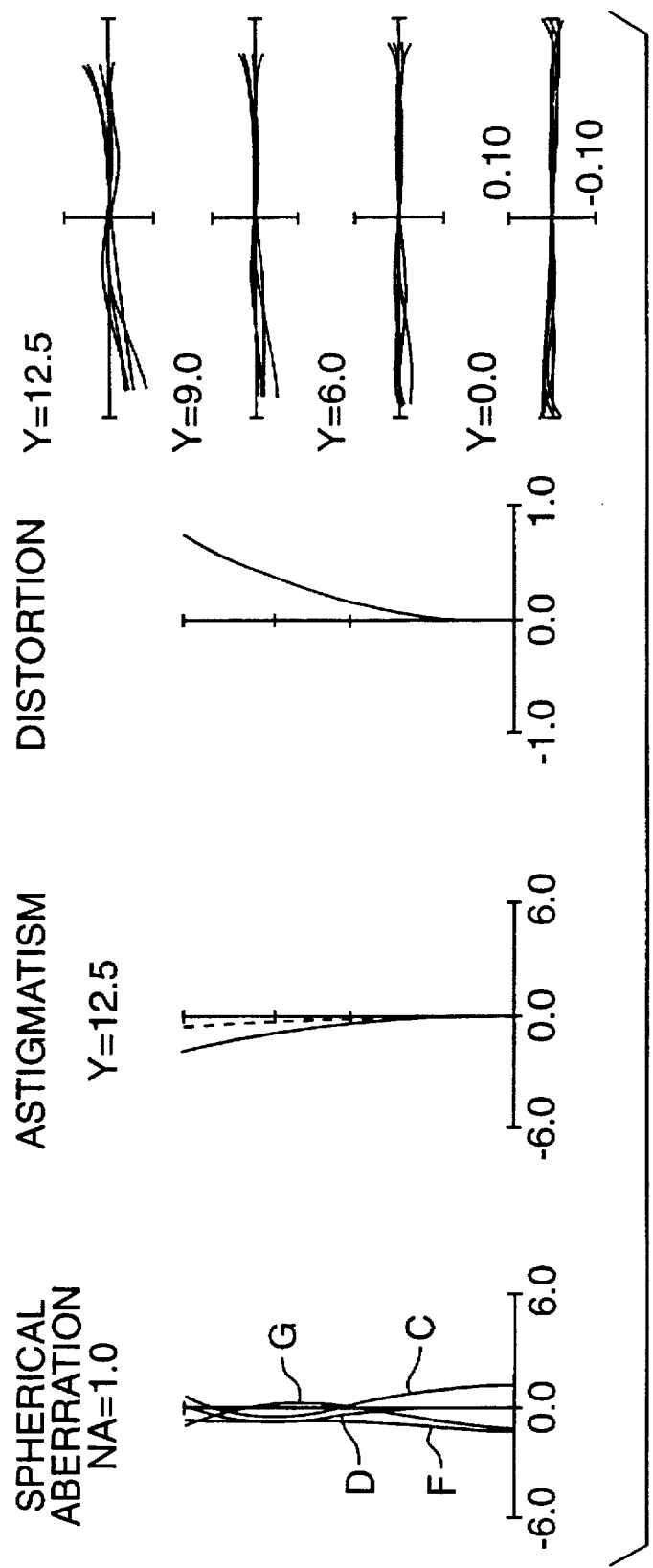
FIG. 4 provides plots of various aberrations exhibited by an objective lens according to Example Embodiment 2.
Figure 6:
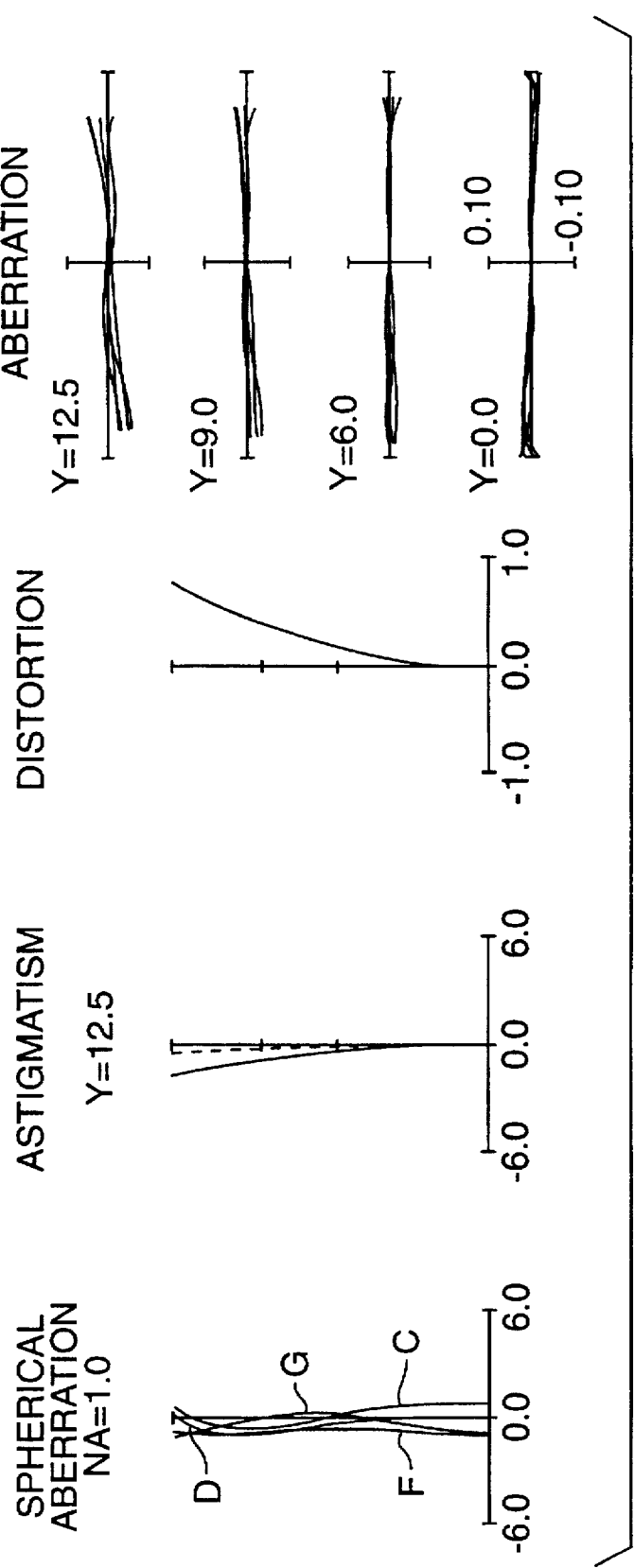
FIG. 6 provides plots of various aberrations exhibited by an objective lens according to Example Embodiment 3.

FIGS. 2, 4, and 6 provide, for Example Embodiments 1, 2, and 3, respectively, plots of spherical aberration, astigmatism, distortion, and transverse chromatic aberration. In FIGS. 2, 4, and 6, D denotes a curve obtained with D-line light (λ=587.6 nm), C denotes a curve obtained with C-line light (λ=656.3 nm), F denotes a curve obtained with F-line light (λ=486.1 nm), and G denotes a curve obtained with G-line light (λ=435.8 nm). In the plots of astigmatism, the solid line represents the sagittal image plane and the dashed line represents the meridional image plane.

From FIGS. 2, 4, and 6, it can be seen that each of the Example Embodiments exhibits excellent imaging properties. Even in Example Embodiments 2 and 3 that are intended for fluorescence microscopy, aberrations are effectively corrected.

Figure 7:
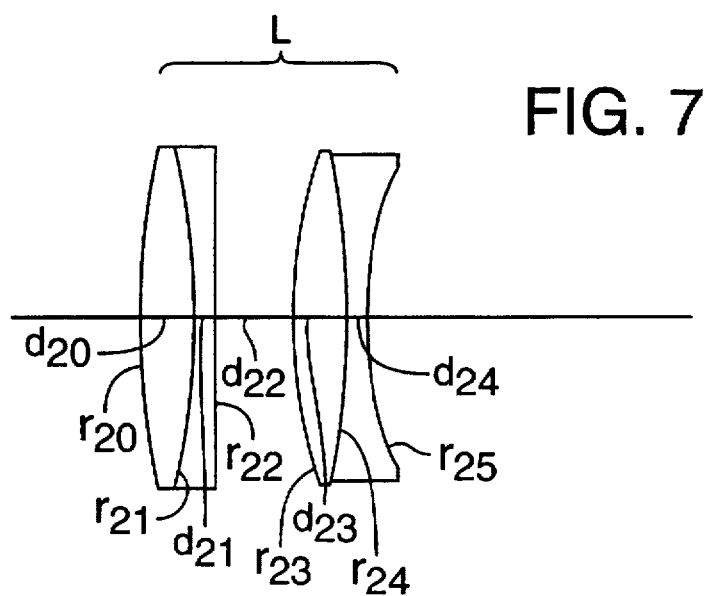
FIG. 7 is an optical diagram of a representative imaging lens (eyepiece lens) useful, in conjunction with an objective lens according to the present invention, for forming an image.

The microscope objective lenses according to the various Example Embodiments form an image at infinity relative to the objective lens. In other words, an image cannot be obtained using the objective lens alone. Consequently, the objective lenses were configured with the understanding that they are to be used with a suitable imaging lens (i.e., eyepiece lens). A representative imaging lens L is shown in FIG. 7 and has the specifications set forth in Table 5, below. The aberration plots shown in FIGS. 2, 4, and 6 were obtained by using the subject objective lens with an eyepiece lens as shown in FIG. 7.

TABLE 5

| No. | r (mm) | d (mm) | $n_D$ | $v_D$ |
|---|---|---|---|---|
| 20 | 75.043 | 5.1 | 1.62280 | 57.03 |
| 21 | –75.043 | 2.0 | 1.74950 | 35.19 |
| 22 | 1600.580 | 7.5 | | |
| 23 | 50.256 | 5.1 | 1.66755 | 41.96 |
| 24 | –84.541 | 1.8 | 1.61266 | 44.40 |
| 25 | 36.911 | | | |

In view of the foregoing, objective lenses according to the present invention are apochromatic immersion-type objective lenses for use in microscopy. The objective lenses have a magnification of approximately 40× and exhibit superior correction of chromatic aberrations and image-plane distortion using an "embedded" lens approach without a need to include a Gauss-type lens configuration.

Whereas the invention has been described in connection with a preferred general embodiment and several Example Embodiments, it will be understood that the invention is not limited to those embodiments. On the contrary, the invention is intended to cover all alternatives, modifications, and equivalents as may be included within the spirit and scope of the invention as defined by the appended claims.

What is claimed is:

1. An immersion-type microscope objective lens, comprising, in order from the object side:

(a) a first lens group having a positive refractive power, a second lens group having a positive refractive power, and a third lens group having a negative refractive power;

(b) the first lens group comprising a planoconvex lens element as the most objectwise lens element in the first lens group, the planoconvex lens element having a refractive index $n_1$ and a convex surface having a curvature radius $r_2$; a negative meniscus lens element having a refractive index $n_2$, a concave surface having a curvature radius $r_2$ cemented to the planoconvex lens element, and a convex surface oriented imagewise and having a curvature radius $r_3$; and a positive meniscus lens element having a concave surface oriented objectwise;

(c) the second lens group comprising a cemented lens component including a negative lens element that is the most objectwise lens element in the second lens group, the negative lens element having a focal length $f_{2n}$;

(d) the third lens group comprising a cemented lens component having a negative refractive power and a meniscus configuration with a concave surface oriented imagewise and an overall axial thickness $D_3$, the cemented lens component including a positive lens element having a refractive index $n_{3p}$ cemented to a negative lens element having a refractive index $n_{3n}$ and having a concave surface with curvature radius $r_e$ that is the most imagewise surface of the objective lens;

(e) the objective lens having an overall focal length f and satisfying the Conditional Expressions:

$n_2 - n_1 \geq 0.2$ $4.5 \leq r_3/r_2 \leq 5.7$ $5 \leq -f_2/f \leq 12$ $1 \leq D_3/f \leq 3$ $10 \leq r_e/|(n_{3p} - n_3)f| \leq 40$.

2. The objective lens of claim 1, having a magnification of about 40×.

3. The objective lens of claim 1, exhibiting apochromatic optical performance.

4. The objective lens of claim 1, wherein $n_1$ is substantially the same as the refractive index of an immersion oil with which the objective lens is used.

5. The objective lens of claim 1, wherein the second lens group consists of multiple cemented lens components.

6. The objective lens of claim 5, wherein one of the cemented lens components in the second lens group consists of a negative lens cemented to a positive lens cemented to a negative lens.

7. The objective lens of claim 1, having additional characteristics as follows:

a focal length f=5 mm, a magnification β=−40×, a numerical aperture N.A.=1.0, and a working distance W.D.= −0.1713 mm;

values of conditional expressions as follows:

$n_2 - n_1 = 0.250$ $r_3/r_2 = 5.55$ $|f_{2r}/f| = 6.12$ $D_3/f = 2.5$ $r_e/|(n_{3p} - n_{3n})f| = 24.77$; and surfaces with curvature radii (r), inter-surface axial distances (d), indices of refraction $n_D$, and Abbe numbers $v_D$ as follows:

| No. | r (mm) | d (mm) | $n_D$ | $v_D$ | Lens Group |
|---|---|---|---|---|---|
| 1 | ∞ | 0.65 | 1.51680 | 64.10 | $G_1$ |
| 2 | −1.031 | 6.0 | 1.76684 | 46.80 | $G_1$ |
| 3 | −5.724 | 0.25 | | | |
| 4 | −16.881 | 4.0 | 1.49782 | 82.52 | $G_1$ |
| 5 | −8.965 | 0.1 | | | |
| 6 | 127.147 | 4.0 | 1.49782 | 82.52 | $G_1$ |
| 7 | −17.097 | 1.0 | | | |
| 8 | 55.240 | 1.5 | 1.75520 | 27.61 | $G_2$ |
| 9 | 16.097 | 6.3 | 1.43385 | 95.25 | $G_2$ |
| 10 | −20.151 | 0.2 | | | |
| 11 | 32.616 | 1.7 | 1.74000 | 28.19 | $G_2$ |
| 12 | 18.275 | 7.0 | 1.43385 | 95.25 | $G_2$ |
| 13 | −18.275 | 1.7 | 1.52682 | 51.35 | $G_2$ |
| 14 | 188.206 | 12.5 | | | |
| 15 | 25.968 | 6.9 | 1.61750 | 30.83 | $G_3$ |
| 16 | −15.077 | 5.6 | 1.52682 | 51.35 | $G_3$ |
| 17 | 11.230($R_e$) | | | | |

8. The objective lens of claim 1, having additional characteristics as follows:

a focal length f=5 mm, a magnification β=−40×, a numerical aperture N.A.=1.0, and a working distance W.D.= −0.1713 mm;

values of conditional expressions as follows:

$n_2 - n_1 = 0.252$ $r_3/r_2 = 5.31$ $|f_{2r}/f| = 10.17$ $D_3/f = 2.2$ $r_e/|(n_{3p} - n_{3n})f| = 18.10$; and surfaces with curvature radii (r), inter-surface axial distances (d), indices of refraction $n_D$, and Abbe numbers $v_D$ as follows:

| No. | r (mm) | d (mm) | $n_D$ | $v_D$ | Lens Group |
|---|---|---|---|---|---|
| 1 | ∞ | 0.65 | 1.51823 | 58.90 | $G_1$ |
| 2 | −1.031 | 6.0 | 1.77073 | 50.22 | $G_1$ |
| 3 | −5.477 | 0.25 | | | |
| 4 | −24.966 | 4.0 | 1.43385 | 95.25 | $G_1$ |
| 5 | −8.533 | 0.15 | | | |
| 6 | 105.261 | 1.5 | 1.62004 | 36.27 | $G_1$ |
| 7 | 27.021 | 6.5 | 1.43385 | 95.25 | $G_1$ |
| 8 | −17.763 | 0.1 | | | |
| 9 | 29.557 | 1.55 | 1.57501 | 41.42 | $G_2$ |
| 10 | 14.419 | 6.3 | 1.43385 | 95.25 | $G_2$ |
| 11 | −28.320 | 0.15 | | | |
| 12 | 42.870 | 1.35 | 1.60342 | 38.03 | $G_2$ |
| 13 | 13.468 | 6.75 | 1.43385 | 95.25 | $G_2$ |
| 14 | −17.270 | 1.85 | 1.60342 | 38.03 | $G_2$ |
| 15 | 317.805 | 12.4 | | | |
| 16 | 27.454 | 6.0 | 1.68893 | 31.08 | $G_3$ |
| 17 | −16.587 | 5.0 | 1.56384 | 60.69 | $G_3$ |
| 18 | 11.319($R_e$) | | | | |

9. The objective lens of claim 1, having additional characteristics as follows:

a focal length f=5 mm, a magnification β=−40×, a numerical aperture N.A.=1.0, and a working distance W.D.= −0.1713 mm;

values of conditional expressions as follows:

$n_2 - n_1 = 0.252$ $r_3/r_2 = 5.42$ $|f_{2r}/f| = 5.77$ $D_3/f = 2.2$ $r_e/|(n_{3p} - n_{3n})f| = 18.21$; and surfaces with curvature radii (r), inter-surface axial distances (d), indices of refraction $n_D$, and Abbe numbers $v_D$ as follows:

| No. | r (mm) | d (mm) | $n_D$ | $v_D$ | Lens Group |
|---|---|---|---|---|---|
| 1 | ∞ | 0.65 | 1.51823 | 58.90 | $G_1$ |
| 2 | −1.031 | 6.0 | 1.77073 | 50.22 | $G_1$ |
| 3 | −5.584 | 0.2 | | | |
| 4 | −24.557 | 4.0 | 1.49782 | 82.52 | $G_1$ |
| 5 | −8.641 | 0.15 | | | |
| 6 | 108.446 | 1.5 | 1.60342 | 38.03 | $G_1$ |
| 7 | 19.412 | 5.7 | 1.43385 | 95.25 | $G_1$ |
| 8 | −16.874 | 0.1 | | | |

-continued

| No. | r (mm) | d (mm) | $n_D$ | $v_D$ | Lens Group |
|---|---|---|---|---|---|
| 9 | 38.463 | 3.8 | 1.49782 | 82.52 | $G_2$ |
| 10 | −44.231 | 1.0 | 1.55200 | 49.71 | $G_2$ |
| 11 | 25.052 | 5.0 | 1.43385 | 95.25 | $G_2$ |
| 12 | −28.734 | 0.1 | | | |
| 13 | 40.212 | 1.3 | 1.60342 | 38.03 | $G_2$ |
| 14 | 13.649 | 6.7 | 1.43385 | 95.25 | $G_2$ |
| 15 | −17.653 | 1.8 | 1.60342 | 38.03 | $G_2$ |
| 16 | 563.685 | 12.4 | | | |
| 17 | 26.604 | 6.0 | 1.68893 | 31.08 | $G_3$ |
| 18 | −17.707 | 5.0 | 1.56384 | 60.69 | $G_3$ |
| 19 | 11.386($R_e$) | | | | |

* * * * *

UNITED STATES PATENT AND TRADEMARK OFFICE
CERTIFICATE OF CORRECTION

PATENT NO. : 5,798,869

DATED : August 25, 1998

INVENTOR(S) : KATSUYA WATANABE

It is certified that error appears in the above-indentified patent and that said Letters Patent is hereby corrected as shown below:

Column 1, line 33, insert --and-- after "use" and before "having".

Column 2, line 8, "$n_2 - n_1 > 0.2$" should be --$n_2 - n_1 \geq 0.2$--.

Column 2, line 15, insert the expression number --(5)-- on the right edge of the line.

In the Claims:

Column 9, line 7, claim 1, "$5 \leq - f_2/f \leq 12$" should be --$5 \leq |f_{2n}/f| < 12$--.

Column 9, line 10, claim 1, "$10 \leq r_e/[(n_{3p} - n_3)f] \leq 40$" should be --$10 \leq r_e/[(n_{3p} - n_{3n})f] \leq 40$--.

Column 9, line 38, claim 7, "$r_c/[(n_{3p} - n_{3n})f] = 24.77$" should be --$r_e/[(n_{3p} - n_{3n})f] = 24.77$--.

Column 10, line 7, claim 8, "$|f_{2n}/f = 10.17$" should be --$|f_{2n}/f| = 10.17$--.

Column 10, line 52, claim 9, "$r_c/[(n_{3p} - n_{3n})f] = 18.21$" should be --$r_e/[(n_{3p} - n_{3n})f] = 18.21$--.

Signed and Sealed this

Fifth Day of October, 1999

Attest:

Q. TODD DICKINSON

*Attesting Officer*     *Acting Commissioner of Patents and Trademarks*